Patented Oct. 3, 1933

1,928,830

UNITED STATES PATENT OFFICE 1,928,830

PROCESS FOR THE RECOVERY OF A HORMONE OF THE ANTERIOR LOBE OF THE PITUITARY GLAND

Max Dohrn, Berlin-Charlottenburg, and Walter Hohlweg, Berlin-Hohenneuendorf, Germany, assignors to Schering-Kahlbaum A. G., Berlin, Germany No Drawing. Application November 19, 1929, Serial No. 408,409, and in Germany December 1, 1928

4 Claims. (Cl. 167—74)

Our invention refers to a process for the recovery of a gonadotrope hormone of the anterior lobe of the pituitary gland.

As it is well known, this hormone of the anterior lobe can be precipitated by adding organic solvents which are miscible with water to aqueous solutions, which as for instance the urine of gravid mammals contain the hormone. The hormone-preparations thus obtained are adulterated by a plenty of impurities because also other substances of the solution which are insoluble in organic solvents are precipitated.

This difficulty can be avoided by adding the organic solvent to the solution of the hormone in such quantity that only the impurities are precipitated whilst the hormone remains still in solution. For this purpose the quantity of the organic solvent which is added shall be less than the fourfold quantity of the aqueous solution. The liquid is separated from the deposit and a solution of the hormone in a diluted organic solvent is thus obtained, from which the hormone can be precipitated by adding ether, chloroform or other solvents which are not miscible with water.

Example 1

To 10 litres urine of gravid mammals are added 20 litres alcohol. After removing the deposit and adding 20 litres ether to filtrate the gonadotrope hormone of the anterior lobe of the pituitary gland is precipitated.

Example 2

By working in the manner according to Example 1 but using ethylenchlorhydrine instead of ether the gonadotrope hormone of the anterior lobe is also precipitated.

Example 3

10 kg. of the anterior lobe of the pituitary gland are comminuted and extracted with water. To the extract the twofold quantity of alcohol is added and the deposit removed by filtration. From the filtrate the gonadotrope hormone of the anterior lobe is precipitated by adding the equal quantity of chloroform. In the foregoing examples, the alcohol used is preferably ethyl alcohol of commercial concentration, but methyl alcohol may be used with equally good results.

Various changes may be made in the details disclosed in the foregoing specification without departing from the invention or sacrificing the advantages thereof.

We claim:—

1. The process of recovering the gonadotrope hormone of the anterior lobe of the pituitary gland from aqueous solution containing such hormone, comprising precipitating firstly the impurities with the two to four fold quantity of an organic miscible with water solvent and thereafter the hormone itself by adding an organic liquid which is not miscible with water.

2. The process of recovering the gonadotrope hormone of the anterior lobe of the pituitary gland from urine of gravid mammals, comprising precipitating firstly the impurities with the two to four fold quantity of an organic miscible with water solvent and thereafter the hormone itself by adding an organic liquid which is not miscible with water.

3. The process of recovering the gonadotrope hormone of the anterior lobe of the pituitary gland from aqueous solution containing such hormone, comprising precipitating firstly the impurities with the two to four fold quantity of alcohol and thereafter the hormone itself by adding ether.

4. The process of recovering the gonadotrope hormone of the anterior lobe of the pituitary gland from urine of gravid mammals, comprising precipitating firstly the impurities with the two to four fold quantity of alcohol and thereafter the gonadotrope hormone itself by adding ether.

MAX DOHRN.
WALTER HOHLWEG.